(12) United States Patent
Thaler

(10) Patent No.: US 6,313,883 B1
(45) Date of Patent: Nov. 6, 2001

(54) METHOD AND APPARATUS FOR FINITE LOCAL ENHANCEMENT OF A VIDEO DISPLAY REPRODUCTION OF IMAGES

(75) Inventor: Herbert A. Thaler, Framingham, MA (US)

(73) Assignee: Vista Medical Technologies, Inc., Carlsbad, CA (US)

(*) Notice: Subject to any disclaimer, the term of this patent is extended or adjusted under 35 U.S.C. 154(b) by 0 days.

(21) Appl. No.: 09/404,508

(22) Filed: Sep. 22, 1999

(51) Int. Cl.$^7$ ....................................................... H04N 5/21
(52) U.S. Cl. ............................ 348/630; 348/631; 348/712
(58) Field of Search ................................... 348/630, 712, 348/666, 631, 625, 713, 663; H04N 5/21, 9/64, 9/77

(56) References Cited

U.S. PATENT DOCUMENTS

| | | | |
|---|---|---|---|
| 4,400,721 | * 8/1983 | Macovski | 348/630 |
| 4,721,998 | 1/1988 | Glenn | 358/37 |
| 4,868,645 | 9/1989 | Kobayashi | 358/98 |
| 5,012,331 | 4/1991 | Schuster | 358/37 |
| 5,053,865 | * 10/1991 | Ubukata | 348/631 |
| 5,891,015 | 4/1999 | Strahle | 600/160 |

OTHER PUBLICATIONS

W.C. Hughes, "Electronic Engineers' Handbook", 1st Ed., pp. 20–3, 20–4, McGraw–Hill 1975.

* cited by examiner

Primary Examiner—Sherrie Hsia
(74) Attorney, Agent, or Firm—Pandiscio & Pandiscio

(57) ABSTRACT

A method and apparatus for electronically processing video signals representing images of an object or scene so that details of some portion or all of the object or scene are enhanced in the video display reproduction of the images. Video image signals from a video camera are processed to derive digital color-representative signals and a digital luminance signal, and the luminance signal is filtered to remove higher spatial frequency components. The resulting low pass digital data is subtracted from the original luminance image data, leaving digital data representing the high-pass image components. The high-pass image digital data is passed to an amplification stage where all or only selected pixels are amplified by a factor that varies as a function of the low-pass data value of those pixels and by the location of the pixels within the image. This enables different degrees of enhancement of the light and dark areas of the image. The low-pass data and the high-pass data passed by the amplification stage are added together to form the finite local enhancement version of the luminance data.

32 Claims, 9 Drawing Sheets

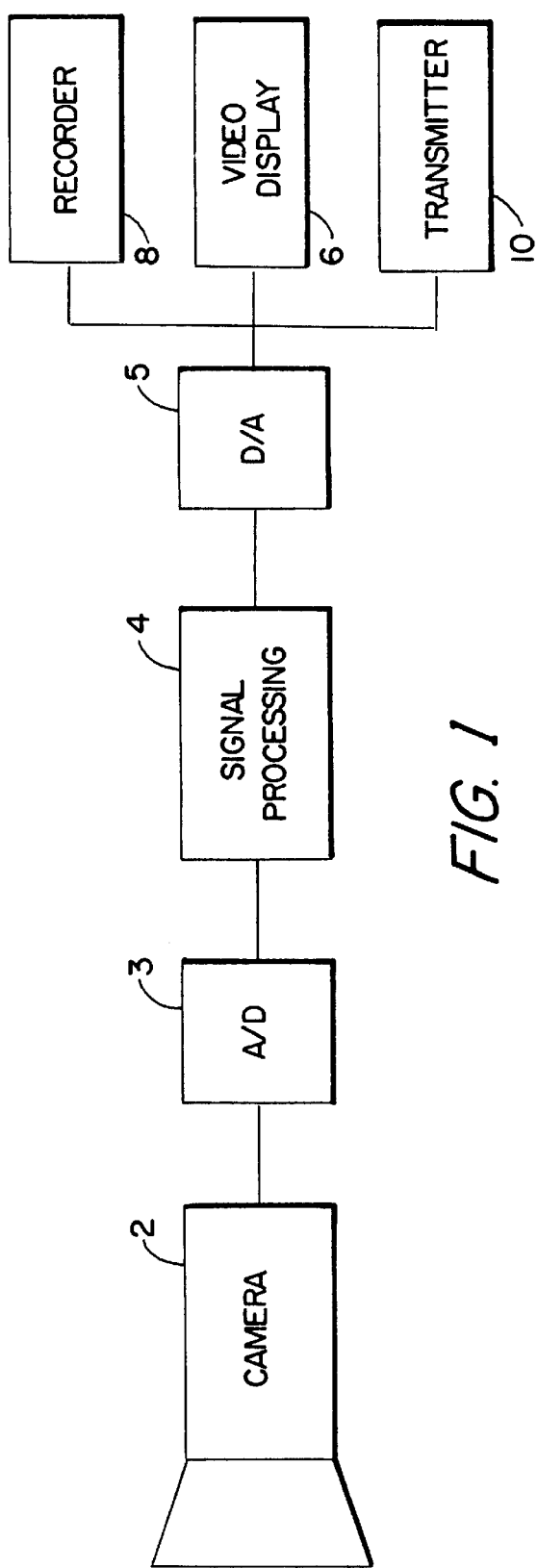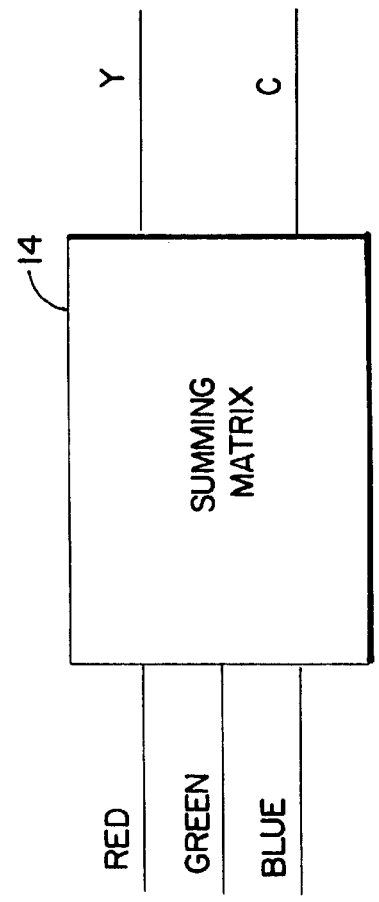

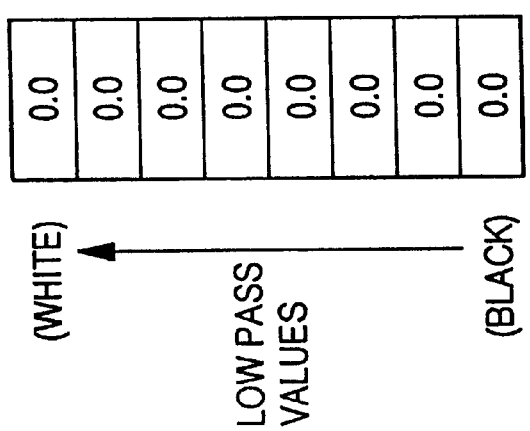
GAIN TABLE MEMORY EXAMPLES
FIG. 4A  GAIN TABLE 0 ALL VALUES = 0
FIG. 4B  GAIN TABLE 1 ALL VALUES = 0.5
FIG. 4C  GAIN TABLE 2 ALL VALUES = 1.0
FIG. 4D  GAIN TABLE 3 ENHANCEMENT LEVEL 1

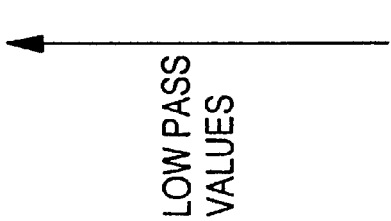

REGIONAL CONTROL TABLE
MEMORY EXAMPLE 1

| 0 | 0 | 0 | 0 | 0 | 0 | 0 | 0 | 0 |
|---|---|---|---|---|---|---|---|---|
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 7 | 7 | 7 | 0 | 0 | 0 |
| 0 | 0 | 0 | 7 | 7 | 7 | 0 | 0 | 0 |
| 0 | 0 | 0 | 7 | 7 | 7 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

VERT ↑

SMALL ENHANCED
REGION SURROUNDED
BY GAIN = 0 AREA

→ HORIZ

*FIG. 5A*

REGIONAL CONTROL TABLE
MEMORY EXAMPLE 2

| 0 | 0 | 0 | 0 | 0 | 0 | 0 | 0 | 0 |
|---|---|---|---|---|---|---|---|---|
| 0 | 0 | 0 | 0 | 0 | 0 | 0 | 0 | 0 |
| 0 | 0 | 7 | 7 | 7 | 7 | 7 | 0 | 0 |
| 0 | 0 | 7 | 7 | 7 | 7 | 7 | 0 | 0 |
| 0 | 0 | 7 | 7 | 7 | 7 | 7 | 0 | 0 |
| 0 | 0 | 7 | 7 | 7 | 7 | 7 | 0 | 0 |
| 0 | 0 | 7 | 7 | 7 | 7 | 7 | 0 | 0 |
| 0 | 0 | 0 | 0 | 0 | 0 | 0 | 0 | 0 |
| 0 | 0 | 0 | 0 | 0 | 0 | 0 | 0 | 0 |

VERT ↑

LARGER ENHANCED
REGION SURROUNDED
BY GAIN = 0 AREA

HORIZ →

*FIG. 5B*

REGIONAL CONTROL TABLE MEMORY EXAMPLE 3

| 0 | 0 | 0 | 0 | 0 | 0 | 0 | 0 | 0 |
|---|---|---|---|---|---|---|---|---|
| 0 | 1 | 1 | 1 | 1 | 1 | 1 | 1 | 0 |
| 0 | 1 | 2 | 2 | 2 | 2 | 2 | 1 | 0 |
| 0 | 1 | 2 | 7 | 7 | 7 | 2 | 1 | 0 |
| 0 | 1 | 2 | 7 | 7 | 7 | 2 | 1 | 0 |
| 0 | 1 | 2 | 7 | 7 | 7 | 2 | 1 | 0 |
| 0 | 1 | 2 | 2 | 2 | 2 | 2 | 1 | 0 |
| 0 | 1 | 1 | 1 | 1 | 1 | 1 | 1 | 0 |
| 0 | 0 | 0 | 0 | 0 | 0 | 0 | 0 | 0 |

↑ VERT

SMALL ENHANCED REGION SURROUNDED BY GRADUATED SOFTENING REGIONS

→ HORIZ

*FIG. 5C*

REGIONAL CONTROL TABLE
MEMORY EXAMPLE 4

| 7 | 7 | 7 | 7 | 7 | 2 | 2 | 2 | 2 |
|---|---|---|---|---|---|---|---|---|
| 7 | 7 | 7 | 7 | 7 | 2 | 2 | 2 | 2 |
| 7 | 7 | 7 | 7 | 7 | 2 | 2 | 2 | 2 |
| 7 | 7 | 7 | 7 | 7 | 2 | 2 | 2 | 2 |
| 7 | 7 | 7 | 7 | 7 | 2 | 2 | 2 | 2 |
| 7 | 7 | 7 | 7 | 7 | 2 | 2 | 2 | 2 |
| 7 | 7 | 7 | 7 | 7 | 2 | 2 | 2 | 2 |
| 7 | 7 | 7 | 7 | 7 | 2 | 2 | 2 | 2 |
| 7 | 7 | 7 | 7 | 7 | 2 | 2 | 2 | 2 |

VERT ↑

SPLIT SCREEN
LEFT SIDE ENHANCED
RIGHT SIDE GAIN = 1

HORIZ →

*FIG. 5D*

METHOD AND APPARATUS FOR FINITE LOCAL ENHANCEMENT OF A VIDEO DISPLAY REPRODUCTION OF IMAGES

This invention relates to video signal processing and more particularly to processing color video signals so as to enhance the video images produced by such signals.

BACKGROUND OF THE INVENTION

The design of picture reproduction systems Involves consideration of a number of factors which affect how a picture is perceived by the human eye, including but not limited to the following factors: (1) sharpness or pictorial clarity, (2) contrast between light areas, dark areas and the related background illumination, and (3) realistic color values. In this context it should be noted that the eye does not respond equally to radiated energy of all visible wavelengths, there is a wide variation in response between observers, and the eye's response is a function of light intensity. See W. C. Hughes, "Electronic Engineers' Handbook", 1st Ed., pp. 20–3, 20–4, McGraw-Hill 1975.

Color video (television) standards are based on the manner in which the eye perceives colored light. In color video systems a wide range of colors can be reproduced for reception by the eye by the addition of only three monochromatic light sources, red, green and blue. The color signals produced by a video camera are encoded before being transmitted to a television receiver or other video display device, the encoded signals comprising a luminance information signal and color signals. As explained by Hughes (supra), p.20–3, the luminance of a surface is the effect on the average eye of the light emitted by a unit area of the surface. Luminance is the integrated effect of the eye response and the visible light power radiated by the surface, both of which are functions of wavelength.

Spatial frequency is the frequency at which an image changes over distance. Luminance is more significant than color at higher spatial frequencies. The human eye response to high spatial frequency information is not the same as it is for low spatial frequency information. Accordingly efforts have been made to process spatial frequency video information signals for the purpose of enhancing the sharpness of reproduced video images. One such effort is represented by U.S. Pat. No. 4,721,998, issued Jan. 26, 1988 to W. E. Glenn for "Method And Apparatus For Processing Color Video Signals". Other such efforts may be known to persons skilled in the art.

The idea of enhancing the images produced by a video camera is particularly intriguing in the case of producing images for surgical or medical purposes. For such purposes, video cameras are utilized in the form of video endoscopes, so-called because the camera is embodied as an integral part of the endoscope, or as an accessory that is attached to the back end of a conventional optical endoscope. In many surgical procedures it is often helpful to enhance color video images in a way which will add to the information perceived by the medical specialist. Details such as small or large blood vessels, differences in tissue condition or tissue types, and the margins between them can be made more distinct and informative by appropriately electronically enhancing the image reproduced by use of the video signals.

OBJECTS AND SUMMARY OF THE INVENTION

A primary object of the invention is to provide a novel method of processing video signals representative of an image so as to produce an enhanced reproduction of that image, or a portion thereof.

Still another object is to provide a method and apparatus for electronically processing video signals representing images of an object or scene so that details of some portion or all of said object or scene are enhanced in the video display reproduction of said images.

These and other objects are achieved by deriving one or more digital color-representative signals and a digital luminance signal from a suitable source, for example, a color video camera or a video recording system or from previously processed video signals. The digital luminance signal is passed through a low-pass FIR (finite impulse response) filter that removes the higher spatial frequency components. The resulting low pass digital data is subtracted from the original luminance image data, leaving the digital data representing the high-pass image components that were rejected by the low-pass filter. The high-pass digital data for each pixel is subjected to amplification ("boost") according to a function of the low-pass data value at that pixel. Essentially the high frequency components of different pixels in an image are boosted differently according to the low spatial frequency components of the same pixels. The lower the value of the lower spatial frequency components, the more the higher spatial frequency components get boosted. The low-pass data and the selectively boosted high-pass data are subsequently added together to form the finite local enhancement version of the luminance data. The finite local enhanced luminance data is used to generate a display of the observed image with all or part of the displayed image being enhanced. To maximize the benefit of the enhancement process, at each pixel the enhanced values of luminance are compared against predetermine minimum and maximum values allowed for image data. Values beyond the valid range are set equal to the predetermined minimum or maximum values respectively.

The invention enables different degrees of enhancement of the light and dark areas of the image, with the darker parts of the picture getting more boost than the lighter areas, unless the operator deliberately selects some other result. The operator may interface with the boost table by selecting a region of the image to be enhanced, and/or by selecting a profile of boost values (less and/or greater than unity) to produce a desired enhancement result.

Other features and advantages of the invention are described or rendered obvious by the following text and the accompanying drawings.

THE DRAWINGS

FIG. 1 is a block diagram illustrating a video signal processing system embodying the present invention;

FIG. 2 is a block diagram that generally illustrates how the color video signals from a camera or other sources are processed to generate a luminance signal and a chrominance signal;

Figure 3:
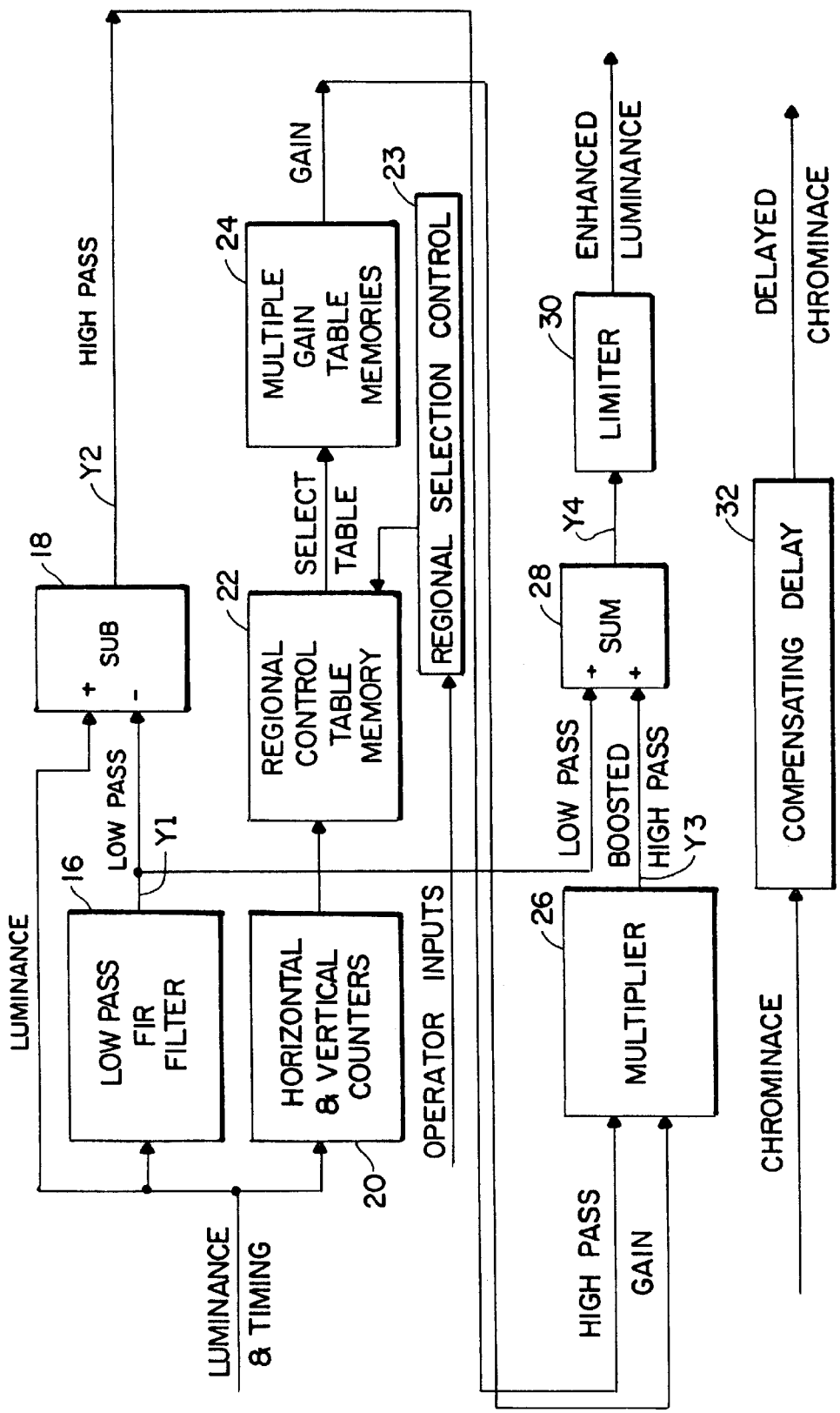

FIG. 3. is a block diagram illustrating a preferred embodiment of the luminance-enhancing system of the present invention;

FIGS. 4A–4H are schematic examples of eight different gain tables; and

FIGS. 5A–5E are schematic examples of different regional control tables.

In the drawings, like components are identified by like numerals.

DESCRIPTION OF PREFERRED EMBODIMENT OF THE INVENTION

Referring to FIG. 1, there is shown a video apparatus comprising a luminance-enhancing digital video signal processing system 4 that embodies the present invention. The processing system 4 is adapted to receive and process video signal inputs derived from a suitable source, e.g., by RF transmission from a remote transmitter, a video recorder, or a video camera. In FIG. 1 the source of the color video signal input is a color television camera 2. By way of example but not limitation, the camera may be a stand alone conventional color television camera or a video camera as incorporated in or coupled to an endoscope or other apparatus. Endoscopes incorporating video cameras are well known and are exemplified by the devices disclosed in U.S. Pat. No. 4,745,471 issued to K. Takamura et al.; U.S. Pat. No. 4,868,645 issued to K. Kobayashi; U.S. Pat. No. 5,577,991 issued to N. Akui et al.; and U.S. Pat. No. 5,891,015, issued to F. Strahle. It is to be understood that if the multicomponent electrical output signal from the camera is in analog form (which currently is the most common format), it is necessary to subject it to analog-to-digital conversion by means of an A/D converter 3 before applying it to the signal processing system 4.

The digital output of signal processing system 4 may be applied without material change to a video display device 6 and/or a video recorder 8 and/or a transmitter 10 if the latter are digitally-operating devices. Alternatively, the digital output signal from signal processing system 4 may be subjected to digital-to-analog conversion via a D/A converter 5 if display 6, recorder 8 and transmitter 10 are analog rather than digital devices.

Referring now to FIG. 2, digital red (R), green (G), and blue (B) color component signals derived from camera 2 or another source are applied to a summing matrix 14 where they are combined to produce a digital luminance signal Y and a digital chrominance signal C which constitutes phase-encoded RGB color data. The Y and C digital signals includes timing data for keeping track of pixels. As is obvious to persons skilled in the art, the color component data output of summing matrix 14 may consist of other digital color-representative signals, e.g., conventional color difference signals such as R-Y and B-Y, or other forms of digital signals which include, in any form, color components data.

Turning now to FIG. 3, the digital signal processing system 4 comprises a filter 16, a subtracting unit or subtractor 18, horizontal and vertical counters 20 for tracking pixels, a regional control tables memory unit 22 containing a plurality of selectively accessible digital regional control tables, a regional selection control 23, a gain tables memory storage unit 24 containing a multiple of accessible stored digital gain tables, a multiplier 26, a summing unit or adder 28, a limiter 30, and a compensating delay device 32. The filter 16 is a low-pass FIR (finite impulse response) filter that removes higher spatial frequency components, from the electrical signal output Y of summing matrix 14. The storage units 22 and 24 may take various forms, e.g., a storage disk or one or more E-proms forming part of a computer.

The regional control memory unit 22 comprises a memory unit in which are stored one or more region selection control tables for generating gain table select command signals that are used to selectively access the gain tables stored in storage unit 24, whereby to vary application of the gain (boost) factors that are applied to multiplier 26 on a pixel-to-pixel basis and thereby vary the enhancing effect of processing system 4 on selected portions of the image represented by luminance signal Y and chrominance signal C. The region selection control 23 is adapted to respond to operator inputs to modify operation of signal processing system 4 by selecting specific regional tables from memory unit 22, so as to vary the area of the observed image that is to be enhanced and/or vary the degree of enhancement.

The storage unit 24 contains in memory a plurality of different gain tables that provide different gain factors for different low spatial frequency values. Preferably also the storage unit 24 contains in memory one or more tables that provide gain factors less than unity As is obvious to a person skilled in the art, certain of the foregoing components may comprise portions of a digital computer. Preferably, but not necessarily, subtractor 18, counters 20, regional table memory unit 22, regional control 23, gain tables memory unit 24, multiplier 26, adder 28 and limiter 30 comprise portions of a digital computer, as indicated by the broken line 7, with the operator inputs to the computer being fed in by keyboard or voice commands. Also two or more of the foregoing devices may be combined into one discrete unit or location, e.g., memory units 22 and 24 may comprise a single E-prom or separate storage addresses on a single hard disk.

The chrominance signal C is passed through the compensating delay device 32 which is adapted to delay that signal by an amount sufficient to have it arrive at video display device 6 and/or video recorder 8 and/or transmitter 10 in time-step with the enhanced luminance signal, i.e., at the output end of signal processing system 4 the chrominance data for each pixel is coincident in time with the enhanced luminance data for that pixel passed by limiter 24, which also includes timing and pixel location data.

Still referring to FIG. 3, the luminance signal Y, which also includes timing and pixel location data, is applied to low-pass filter 16, and also to subtracting unit 18 and horizontal and vertical counters 20. The filter 16 removes the higher spatial frequency components from the luminance signal Y, producing a modified luminance signal Y1 that contains the low spatial frequency image data components of the original luminance signal Y. The low-pass digital output Y1 of filter 16 is applied to subtracting unit 18, where its low spatial frequency image data is subtracted from the luminance image data of the original luminance signal Y, with the result that the output of subtracting unit 18 is a digital luminance signal Y2 that consists of the high-pass image data components that were rejected by the low-pass filter. The low-pass digital output Y1 of filter 16 is also applied to the multiple gain tables memory unit 24 and to adder 28.

The counters 20 track the pixels, and the output signals of those counters are applied to regional memory unit 22, which also is adapted to receive operator inputs from regional selection control 23 for modifying the selection of the regional control tables stored in regional table memory unit 22, whereby to vary the gain table select command signal fed from regional table memory unit 22 to gain tables memory unit 24.

The operator inputs to region selection control 23 may be applied by keyboard or voice or by other suitable means used for inputting instructions to a digital computer. Programming such instructions for region selection control 23 may be accomplished in various ways obvious to persons skilled in the computer programming art The operator inputs are in the form of instructions for selectively causing the processing system 4 to produce the following results: full screen enhancement in which the entire image is subjected to the luminance enhancement process, regional screen enhancement in which only a selected region or regions of the image is enhanced, split screen enhancement in which the image is split into two side-by-side portions and only one portion is enhanced, adjustment of the overall enhancement level, adjustment of the size of the region being enhanced, deliberate reduction of the luminance values in the areas surrounding the area undergoing luminance enhancement, and effectively nulling or by-passing the enhancement process. Thus, for example, full screen enhancement involves enhancing all of the pixels of each image, while regional enhancement involves enhancing only selected pixels. Nulling or bypassing the enhancement process is achieved by programming the region selection control so that it causes the memory unit 24 to provide a gain factor of unity to multiplier 26.. The gain table select command signal output of regional control memory unit 22 is applied to memory unit 24 and functions to (a) select which of the various gain tables stored in memory unit 24 is read to determine the gain to be used by multiplier 26 to enhance the high frequency data luminance signal Y2, and (b) determine which of the pixels of the image are to be enhanced according to the operator inputs, if any. Depending upon the operator input(s), the gain table select command signal output of memory unit 22 also may function to apply a specific gain factor to multiplier 26. Thus, for example, if an image softening effect is desired for a specific region, the region control 23 may be instructed by the operator to regional control table in memory unit 22 that will result in a gain table select command that selects a gain table that provides a gain less than unity for all values of Y1 for pixels that fall within a selected region. It is preferred that processing system 4 be programmed so that, in the absence of any operator input, its normal mode of operation is to apply the enhancement process to all of the pixels of the image represented by the incoming luminance and chrominance signals Y and C.

The low pass digital signal Y1 is applied to gain tables memory unit 24 so that, regardless of which of its gain tables is selected by the gain table select command signal output of memory unit 22, the gain factor represented by the gain signal output from memory unit 24 will vary according to the low pass data value of low pass signal Y1.

The digital high pass data signal output Y2 of subtracting unit 18 is applied to multiplier 26 where it is amplified according to the gain (boost) factor applied to the multiplier from the multiple gain memory unit 24. The result is a boosted high pass luminance signal Y3. The latter is summed with the low pass luminance signal Y1 in adder 28 so as to produce an enhanced luminance signal Y4. That enhanced luminance signal Y4 may be applied without limitation to the video display device 6 and/or video recorder 8 and/or transmitter 10 in time-step with the chrominance signal C. However, in order to maximize the benefit of the enhancement process, it is preferred to pass the signal Y4 through limiter 30 which is adapted to compare the enhanced luminance values with predetermined maximum and minimum values and to (1) change those values that are below the predetermined minimum value so that they equal that minimum value, and (2) change those values that exceed the predetermined maximum value so that they equal the maximum value.

To summarize the operation of processing system 4, each pixel of high-pass image data represented by high pass data luminance signal Y2 is subjected to amplification ("boost") according to a gain factor provided by the gain tables in storage unit 24 that varies as a function of the low-pass data value at that pixel represented by the low-pass luminance signal Y1. This enables different degrees of enhancement of the light and dark areas of the image. The operator may interface with the gain table by selecting, via the signal output of region selection control 22, a specific region of the image to be enhanced and a profile of boost values which produce the enhancement desired. The signal Y4 represents the finite local enhancement version of the luminance data contained in the original luminance signal Y.

FIGS. 4A–4H provide examples of eight different gain tables stored in gain table memory unit 24. For convenience the gain tables in FIGS. 4A–4H are numbered from 0 to 7 so as to distinguish one from the other. The first three gain tables, tables 0, 1 and 2 (FIGS. 4A–4C), provide no enhancement, while the other five tables, tables 3 to 7 (FIGS. 4D–4H), provide five different enhancement levels. FIG. 4A illustrates a gain table for applying a gain of 0 (zero) to multiplier 26 for all low pass frequency values (from black to white). This table is used for regions in which the high frequency values are to be eliminated completely, thereby softening the image as much as possible. FIG. 4B shows a gain table in which a gain of 0.5 is passed to the multiplier in response to all low pass frequency values. This gain table is used where it is desired to soften a region from its normal appearance partially. FIG. 4C differs in that a gain of 1 is provided in response to all low pass frequency values. This gain table is used where it is desired to show pixels with no modification of their normal luminance value. FIG. 4D represents the first of five different enhancement levels. In the case of FIG. 4D, the gain non-uniformly varies from 1.3 for low frequency values representative of black image areas to 1.0 for low frequency values representative of white image areas. The table of FIG. 4E represents a second enhancement level. It varies the gain in equal decrements from 1.7 for low frequency values representative of black image areas to 1.0 for low frequency values representative of white image areas. FIG. 4F shows a gain table for a third enhancement level. In this case the low frequency values representative of black image areas are provided with a gain of 2.7, with the gain factors changing in a non-uniform manner to a low of 1.0 for low frequency values representative of white image areas FIG. 4G provides a gain table for a fourth enhancement level, wherein the gain factors vary non-uniformly from 3.5 for black image areas to 1.0 for white image areas. FIG. 4H provides a fifth enhancement level, wherein the gain factors vary non-uniformly from a maximum value of 4.0 for black image areas to a value of 1.0 for white image areas.

FIGS. 5A–5E provide schematic illustrations of selected examples of regional control tables stored in regional control table memory unit 22. In each figure, the table is represented as consisting of 9 squares on each side, with each square representing a pixel and pixel location. Additionally each pixel has a number representing one of the eight gain tables of FIGS. 4A–4H.

It is to be understood that the number of pixels that are processed by the invention will vary according to the number of pixels making up the image-receiving surface of the electronic imaging device (CCD array or like solid state device) that is used to generate electrical output signals representative of optical images focused on that surface. Accordingly it should be understood that in practice each regional control table will consist of data for a substantially greater number of pixels than are represented in FIGS. 5A–5E.

Figure 5E:
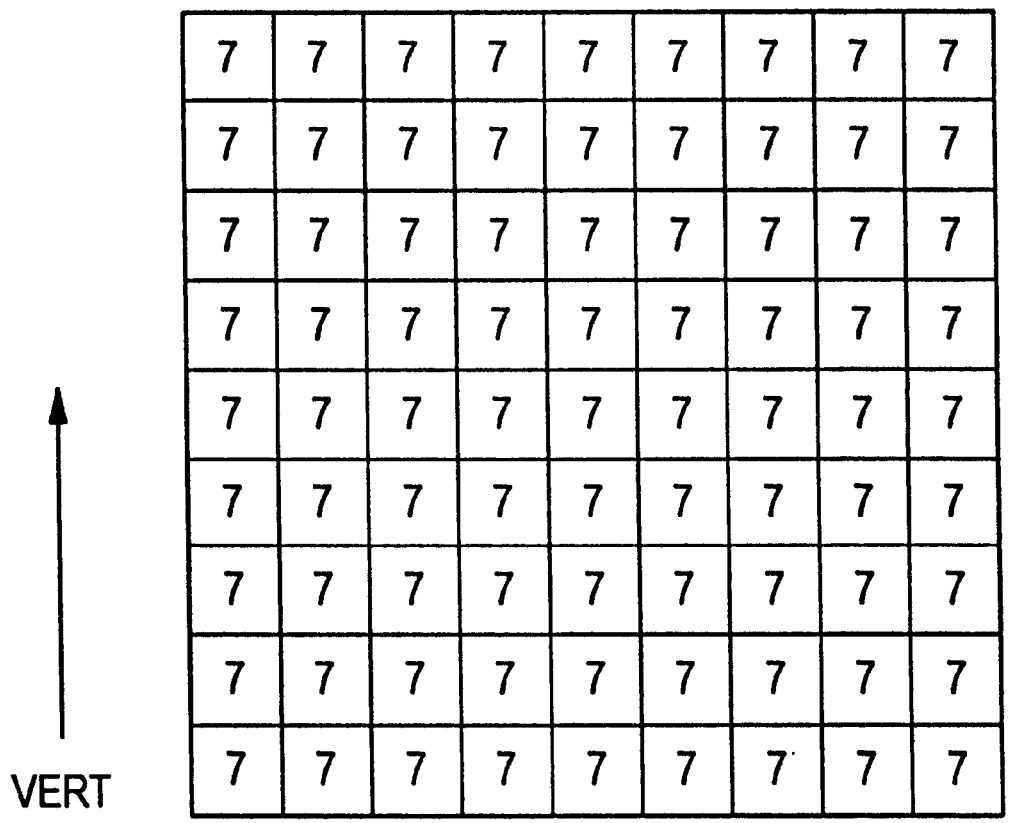

In FIG. 5A, a small rectangular center region consisting of 9 squares, each identified by the numeral "7" to indicate the gain table of FIG. 4H), is surrounded by other squares each identified by the numeral "0" to indicate the gain table of FIG. 4A. Accordingly the pixels assigned the numeral "0" will the maximum softening effect since the table of FIG. 4A has a uniform gain of zero (0.0), while the pixels identified by the numeral "7" will be subjected to the gain factors of the gain table of FIG. 4H. In FIG. 5B, the enhanced region is enlarged to consist of 25 center located pixels, with the remaining surrounding pixels being softened due to being subjected to zero gain according to the table of FIG. 4A. FIG. 5C also has a small rectangular center region consisting of 9 pixels each identified by the numeral "7" to indicate that they will be enhanced according to the gain table of FIG. 4H, but in this case the immediately adjacent pixels on all four sides of the rectangular center region are identified by the numeral "2" indicative of the gain table of FIG. 4C, and the immediate next rows of pixels are identified by the numeral "1" indicative of the gain table of FIG. 5B, while the outermost pixels are identified by the numerical value of "0" indicative of the gain table of FIG. 4A. The net effect is that the pixels in the center region will be enhanced by subjecting them to a gain factor as determined by the table of FIG. 4H, and that enhanced center region of the image is surrounded by pixels that have a graduated "softer" regions that subjected to gain factors determined by the gain tables of FIGS. 4C, 4B and 4A. FIG. 5D illustrates a split screen, wherein five columns of pixels are enhanced by subjecting them to gain factors according to the gain table of FIG. 4H, and the remaining four rows are characterized by no enhancement in luminance due to being subjected to the gain factor of unity according to the gain table of FIG. 4C ("enhancement level 2). In FIG. 5E all of the pixels identified by the numeral "7", indicating that they are all subjected to enhancement according to the gain table of FIG. 4H.

It is to be understood that other regional control tables may be stored in memory unit 22 in addition to or in place of the regional control tables shown in FIGS. 5A–5e. Also other gain tables may be incorporated in addition to or in place of the gain tables shown in FIGS. 4A–4H. The system may be programmed so that the selection of particular regional control tables is automatic. Alternatively, and preferably, the system is programmed so that it automatically accesses a regional table is like that shown in FIGS. 5A–5C, so that the center portion of an image is enhanced and the surrounding regions are not enhanced or in fact subject to a gain less than unity. Predetermined selection of other region control tables may be programmed into the system for particular applications.

The invention provides a luminance enhancement system that is reliable and provides a wide selection of image enhancement formats. Also the system is compatible with and may be embodied in existing imaging systems. It has been found to be particularly advantageous in enhancing images produced by a video endoscope so as to make it easier to discern details and differences in live tissue. In this respect, use of a regional control table patterned like those represented in FIGS. 5B and 5C has been shown to greatly increase the ability of a surgeon to discriminate between different areas of tissue being inspected by means of a video endoscope. A further advantage of the invention is that the enhanced luminance and colorance signals may be readily converted to analog formats for use in operating analog-type display, video recording or video transmitting apparatus. Alternatively, those digital data signals may be used to operate digital display, recording or transmitting apparatus.

It is recognized that persons skilled in the art may readily discern that the invention is susceptible to a number of changes, and in particular that the substantially entire processing system 4 may be embodied in or take the form of a digital computer. Still other changes will be obvious to persons skilled in the art from the foregoing specification. Accordingly the invention shall be deemed to be defined by the following claims which are to be construed in light of the foregoing specification

What is claimed is:

1. A method for generating and enhancing video signals of an image comprising the steps of:

deriving at least one color-representative signal and a luminance signal representative of an image;

processing said luminance signal to produce a modified luminance signal representative of the low spatial frequency portion of said luminance signal;

subtracting said modified luminance signal from said luminance signal so as to produce a high spatial frequency luminance signal;

for at least selected pixels of said image amplifying said high spatial frequency luminance signal by an amount that varies as a function of the value of said modified luminance signal so as to produce an amplified high spatial frequency luminance signal; and for said selected pixels of said image summing said modified luminance signal and said amplified high spatial frequency luminance signal so as to provide an enhanced luminance output signal.

2. Method according to claim 1 further including the step of applying said at least one color-representative signal and said enhanced luminance output signal to means for transmitting or recording same or to means for generating and displaying a video image in response to said color representative signal and said enhanced output signal.

3. Method according to claim 1 including the step of limiting the values of said enhanced luminance output signal.

4. A method for generating and processing a video luminance signal comprising the steps of:

deriving three digital data stream signals representative of the red, green and blue components of an image;

combining said three digital data stream signals to produce a luminance data stream signal representative of the luminance of said image;

passing said luminance data stream signal through a low-pass spatial frequency filter so as to remove higher spatial frequency data and produce a modified luminance data stream signal representative of the low spatial frequency data portion of said luminance data stream signal;

subtracting said modified luminance data stream signal from said luminance data stream signal so as to produce a high spatial frequency luminance data stream signal;

amplifying said high spatial frequency luminance data stream signal by an amount that varies as a function of the value of said modified luminance data stream signal so as to produce an amplified high spatial frequency luminance data stream signal; and summing said modified luminance data stream signal and said amplified high spatial frequency luminance data stream signal so as to provide an output data stream signal representative of finite local enhancement of said luminance data stream signal.

5. Method of claim 4 further including the step of limiting the values of said output data stream signal within predetermined limits.

6. A method for generating and processing a video luminance signal comprising the steps of:

deriving from a video imaging device a plurality of digital color-representative signals and a digital luminance signal representative of the pixels of an image acquired by said video imaging device;

processing said digital luminance signal to produce a low-pass digital luminance signal representative of the low spatial frequency portion of said digital luminance signal;

subtracting said low-pass digital luminance signal from said digital luminance signal so as to produce a high-pass digital luminance signal representative of the high spatial frequency portion of said digital luminance signal;

multiplying said high-pass digital luminance signal by a factor that varies as a function of the value of said low-pass digital luminance signal so as to produce a modified high-pass digital luminance signal; and summing said low-pass digital luminance signal and said modified digital high-pass luminance signal so as to produce an output signal that constitutes a finite local enhancement of said digital luminance signal.

7. Method of claim 6 further including the step of limiting the values of said finite local enhancement output signal within predetermined limits.

8. A method for generating and processing a video luminance signal comprising the steps of:

deriving three digital data streams representative of the red, green and blue components of an image;

combining said three digital data streams to produce a first luminance digital data stream representative of the luminance of said image;

passing said first luminance digital data stream through a low-pass filter that removes higher spatial frequency data and produces a second luminance digital data stream representative of the low spatial frequency data portion of said first luminance digital data stream;

subtracting said second luminance digital data stream from said first luminance digital data stream so as to produce a third luminance digital data stream representative of the high spatial frequency portion of said first luminance digital data stream;

multiplying said third luminance digital data stream by a gain factor that varies as a function of the value of said second luminance digital data stream so as to produce a fourth luminance digital data stream; and summing said second luminance digital data stream and said fourth luminance digital data stream so as to provide an output digital data stream representative of finite local enhancement of said first luminance digital data stream.

9. A method according to claim 8 further including the step of applying said output digital data stream to means for transmitting or recording same or to means for generating and displaying a video image in response to said output digital data stream.

10. Method of claim 9 further including the step of limiting the values of said output digital data stream.

11. Apparatus for generating and processing video signals representative of an image comprising:

means for generating a plurality of digital color-representative signals corresponding to the color components of an image and a first digital luminance signal representative of the luminance of said image;

means for processing said first digital luminance signal to produce a second digital luminance signal representative of the low spatial frequency portion of said first digital luminance signal;

means for subtracting said second digital luminance signal from said first digital luminance signal so as to produce a third digital luminance signal representative of the high spatial frequency component of said first digital luminance signal;

means for multiplying said third digital luminance signal by an amount that varies as a function of the value of said second digital luminance signal so as to produce a fourth digital luminance signal; and means for summing said second digital luminance signal and said fourth digital luminance signal so as to provide a digital luminance output signal constituting a finite local enhanced version of said first digital luminance signal.

12. Apparatus according to claim 11 further including means for converting said color-representative signals and said digital luminance output signal to corresponding analog signals, and means for applying said analog signals to means for transmitting or recording said analog signals.

13. Apparatus according to claim 11 further including means for converting said color-representative signals and said digital luminance output signal to corresponding analog signals, and means for applying said analog signals to display means for generating and displaying video reproductions of said image in response to said analog signals.

14. Apparatus according to claim 11 wherein said means for generating said color-representative signals and said luminance signal comprises a video camera.

15. Apparatus according to claim 14 wherein said camera produces an analog video signal representative of images captured by said camera, and further including means for converting said analog video signal to said digital color representative signals and said first digital luminance signal.

16. Apparatus for generating an enhanced video luminance signal comprising:

means for deriving three digital data stream signals representative of the red, green and blue color components of an image;

means for combining said three digital data stream signals so as to produce a first luminance data stream signal representative of the luminance of said image;

means including a low-pass filter for processing said first luminance data stream signal so as to remove therefrom higher spatial frequency data and produce a second luminance data stream signal representative of the low spatial frequency data portion of said first luminance data stream signal;

means for subtracting said second luminance data stream signal from said first luminance data stream signal so as to produce a third luminance data stream signal representative of the high spatial frequency data portion of said first luminance data stream signal;

means operative for each pixel of said image for multiplying said third luminance data stream signal by an amount that varies as a function of the value of said second luminance data stream signal so as to produce a fourth luminance data stream signal; and means operative for each pixel of said image for summing said second luminance data stream signal and said fourth luminance data stream signal so as to produce an output luminance data stream signal constituting the finite local enhanced version of said first luminance data stream signal.

17. Apparatus according to claim 16 further including means for limiting the values of said output luminance data stream signal within predetermined limits.

18. Apparatus according to claim 16 wherein said means for deriving said three digital data stream signals representative of the red, green and blue color components of an image comprises a video camera.

19. Apparatus for generating and processing video signals comprising:

means for deriving an input luminance digital data stream signal and a digital color-representative signals representative of a image;

a low pass FIR filter for processing said input luminance digital data signal so as to remove therefrom higher spatial frequency data and produce an modified luminance digital data stream signal representative of the lower spatial frequency data portion of said input luminance digital data signal;

means for subtracting said modified luminance digital data stream signal from said input luminance digital data stream signal so as to produce a higher spatial frequency digital data stream signal;

means responsive to said higher spatial frequency data stream signal and said modified luminance data stream signal for amplifying said higher spatial frequency data stream signal as a function of the value of said modified luminance data stream signal, whereby to produce a boosted higher spatial frequency luminance data stream signal; and means for summing said boosted higher spatial frequency luminance data stream signal and said modified luminance data stream signal so as to provide an output luminance digital data stream signal that constitutes an enhanced version of said input luminance digital data stream signal.

20. Apparatus according to claim 19 further including means for limiting the values of the luminance data in said output luminance data stream signal.

21. Apparatus for generating and processing video signals representative of an image comprising:

a video camera for generating an output video signal representative of an image captured by said camera;

means responsive to said output video signal for generating red, green and blue color signals representative of said image;

means responsive to said red, green and blue color signals for deriving therefrom a first luminance digital data signal and color data signals representative of said image;

a low pass FIR filter for processing said first luminance digital data signal so as to remove therefrom higher spatial frequency data and produce a second luminance digital data signal representative of the lower spatial frequency data portion of said first luminance digital data signal;

means for subtracting said second luminance digital data signal from said first luminance digital data signal so as to produce a third luminance digital data signal representative of the higher spatial frequency data of said first luminance digital data signal;

means responsive to said third luminance digital data signal and said second luminance digital data signal for amplifying said third digital data signal as a function of the value of said second luminance digital data signal, whereby to produce a fourth luminance digital data signal; and means for summing said fourth luminance digital data signal and said second luminance digital data signal so as to provide a luminance digital data output signal which constitutes an enhanced version of said first luminance digital data signal.

22. Apparatus according to claim 21 further including means for applying said color signals and said luminance digital data output signal to means for transmitting or recording said color signals and said luminance digital data output signal.

23. Apparatus according to claim 21 further including means for applying said color signals and said luminance digital data output signal to display means for generating and displaying a video reproduction of said image in response to said color signals and said luminance digital data output signal.

24. Apparatus according to claim 21 further including means for limiting the values of said enhanced luminance data signal according to predetermined maximum and minimum limits.

25. A method for generating a video luminance signal comprising the steps of:

deriving at least one color-representative signal and a first luminance signal representative of an image;

processing said luminance signal to produce a second low-pass luminance signal representative of the low spatial frequency portion of said first luminance signal;

subtracting said second low-pass luminance signal from said first luminance signal so as to produce a third high-pass luminance signal representative of the high spatial frequency portion of said first luminance signal;

for one or more pixels of said image amplifying said third high-pass luminance signal by an amount that varies as a function of the value of said second low-pass luminance signal so as to produce a fourth amplified high-pass luminance signal; and for said one or more pixels of said image summing said second low-pass luminance signal and said fourth amplified high-pass luminance signal so as to produce an output luminance signal that constitutes a finite local enhancement of said first luminance signal.

26. A method for generating a video luminance signal comprising the steps of:

deriving three digital data streams representative of the red, green and blue components of an image;

combining said three digital data streams to produce a first luminance data stream representative of the brightness of said image;

passing said first luminance data stream through a low-pass filter that removes higher spatial frequency data and produces a second luminance data stream representative of the low spatial frequency data portion of said first luminance data stream;

subtracting said second luminance data stream from said first luminance data stream so as to produce a third luminance data stream representative of the high spatial frequency portion of said first luminance data stream;

for each pixel of said image amplifying said third luminance data stream by an amount that varies as a function of the value of said second luminance data stream so as to produce a fourth luminance data stream representative of the amplified high spatial frequency luminance data; and for each pixel of said image summing said second luminance data stream and said fourth luminance data stream so as to provide an output data stream that comprises a finite local enhancement of said first luminance data stream.

27. A method according to claim 26 further including the step of selectively amplifying the data of said third luminance data stream representative of the luminance of a first group of selected pixels according to a first gain table and amplifying the data of said third luminance data stream representative of the luminance of a second group of selected pixels according to a different gain table.

28. A method according to claim 27 wherein the pixels of said first group form a first selected region of said image and the pixels of said second group form a second selected region of said image.

29. A method according to claim 28 wherein said first region is bordered by said second region.

30. A method according to claim 28 wherein said first region is surrounded by said second region.

31. A method according to claim 28 wherein for said first group of pixels their luminance value in said output data stream is greater than their luminance value in said first luminance data stream, and for said second group of pixels their luminance value in said output data stream is less than their luminance value in said first luminance data stream.

32. Apparatus for generating video signals representative of an image comprising:

means for generating a plurality of color-representative signals corresponding to the color components of an image and a luminance signal representative of the brightness of said image;

means for processing said luminance signal to produce a modified luminance signal representative of the low spatial frequency portion of said luminance signal;

means for subtracting said modified luminance signal from said luminance signal so as to produce a high spatial frequency luminance signal;

means for amplifying said high spatial frequency luminance signal for certain selected pixels of said image by an amount that varies according to a first predetermined gain table as a function of the value of said modified luminance signal and for amplifying said high spatial frequency luminance signal for other selected pixels by an amount that varies according to a second gain table as a function of the value of said modified luminance signal, whereby to produce an amplified high spatial frequency luminance signal; and means operative for each pixel of said image for summing said modified luminance signal and said amplified high spatial frequency luminance signal so as to provide an output signal representative of the finite local enhanced version of said luminance signal.

* * * * *